United States Patent [19]

Benuzzi

[11] 4,334,450
[45] Jun. 15, 1982

[54] SAWING MACHINES

[75] Inventor: Gino Benuzzi, Bologna, Italy

[73] Assignee: Giben Impianti S.p.A., Pianoro, Italy

[21] Appl. No.: 158,020

[22] Filed: Jun. 9, 1980

[30] Foreign Application Priority Data

Jun. 20, 1979 [IT] Italy .............................. 15215/79[U]

[51] Int. Cl.³ .......................... B26D 1/18; B27B 5/18
[52] U.S. Cl. ................................. 83/471.2; 83/477.1;
83/488; 83/701
[58] Field of Search ...................... 83/169, 471.2, 477,
83/477.1, 483, 485, 486, 487, 488, 635, 637, 701

[56] References Cited

U.S. PATENT DOCUMENTS

| 1,756,287 | 4/1930 | Freshwater et al. | 83/488 X |
| 2,365,987 | 12/1944 | Zimmerman | 83/487 X |
| 2,379,271 | 6/1945 | Bechtel | 83/637 |
| 2,800,932 | 7/1957 | Scott | 83/485 X |
| 2,870,802 | 1/1959 | Richards | 83/471.2 |
| 3,485,138 | 12/1969 | Staehle | 308/3.5 X |
| 4,099,798 | 7/1978 | Steinmetz | 308/3.5 |

FOREIGN PATENT DOCUMENTS 2213121 9/1972 Fed. Rep. of Germany ........ 83/169
1232800 12/1968 United Kingdom .

Primary Examiner—Frank T. Yost
Assistant Examiner—Robert P. Olszewski
Attorney, Agent, or Firm—Pollock, Vande Sande & Priddy

[57] ABSTRACT

A saw-carrying carriage consists of a supporting frame movable along horizontal guides, onto which frame there is vertically movably mounted a structure which carries the circular saw and the electric motor for driving it. The vertically movable structure comprises a pair of vertical rods slidable within vertical tubular guides secured to the supporting frame. The top ends of the vertical rods are conically shaped, and the top ends of the vertical tubular guides have downwardly directed hollow conical seats. The bottom ends of the vertical rods of the movable structure are connected to a bar to which are also secured the stems of two piston-and-cylinder units, the cylinders of each unit being secured to the supporting frame of the carriage. In this manner, retraction of the stems inside the cylinders will promote lifting of the movable unit which carries the saw. At the end of the upward stroke of the movable structure, the conical ends of the vertical rods will fit snugly into the hollow conical seats of the tubular guides, thus assuring very stable and accurate positioning of the structure, and of the saw carried thereby, in its working position.

4 Claims, 3 Drawing Figures

SAWING MACHINES

SUMMARY OF THE INVENTION

The present invention relates to improvements in sawing machines of the type comprising a horizontal work-piece support table having a straight longitudinal slot defining a cutting line, a sawing tool mounted on a carriage reciprocably movable along a path parallel to and beneath the cutting line, and a longitudinal pressure bar arranged above the workpiece support table, which pressure bar extends along the entire length of the cutting line and can be raised and lowered with respect to the workpiece support table so as to be capable of blocking thereon the workpiece to be sawed. The sawing tool usually consists of a circular saw which is mounted on the carriage for vertical movement, so that, during the working stroke of the carriage, it projects through the slot above the upper surface of the workpiece support table and consequently cuts the workpiece blocked on the table, while during the return stroke of the carriage the circular saw lies in rest position below the upper surface of the workpiece support table. The return (or non-working) stroke of the carriage, with the circular saw in lowered position, is convenient because it permits the operator to move the workpiece which has just been cut immediately into position for the next cutting stroke, thus avoiding dead time in the operating cycle of the sawing machine, and because it avoids accidents, with consequent severe injuries to the operators of the machine.

A sawing machine of the type above referred to is described, for example, in my British Patent No. 1,232,800.

In prior art machines, vertical movement of the circular saw mounted on the carriage, above and below the upper surface of the workpiece support table, is obtained by adopting very simplified devices, which present however the drawback of being rather unaccurate and not dependable after a certain time of operation.

The present invention, more precisely, relates to improvements in the saw-carrying carriage and particularly in the devices used for the vertical movement of the circular saw.

According to the invention, the saw-carrying carriage consists of a supporting frame movable along horizontal guides, onto which frame there is vertically movably mounted a structure which carries the circular saw and the electric motor for driving it. The vertically movable structure comprises a pair of vertical rods slidable within vertical tubular guides secured to the supporting frame. The top ends of the vertical rods are conically shaped, and the top ends of the vertical tubular guides have downwardly directed hollow conical seats. The bottom ends of the vertical rods of the movable structure are connected to a bar to which there are also secured the stems of two piston-and-cylinder units, the cylinders of each unit being secured to the supporting frame of the carriage. In this manner, retraction of the stems inside the cylinders will promote lifting of the movable unit which carries the saw. At the end of the upward stroke of the movable structure, the conical ends of the vertical rods will fit snugly into the hollow conical seats of the tubular guides, thus assuring a very stable and accurate positioning of the structure, and of the saw carried thereby, in its working position.

BRIEF DESCRIPTION OF THE DRAWINGS

The above and other features of the invention will become evident from the following description of a preferred embodiment, made with reference to the accompanying drawings, in which.

DESCRIPTION OF THE PREFERRED EMBODIMENT

Figure 1:
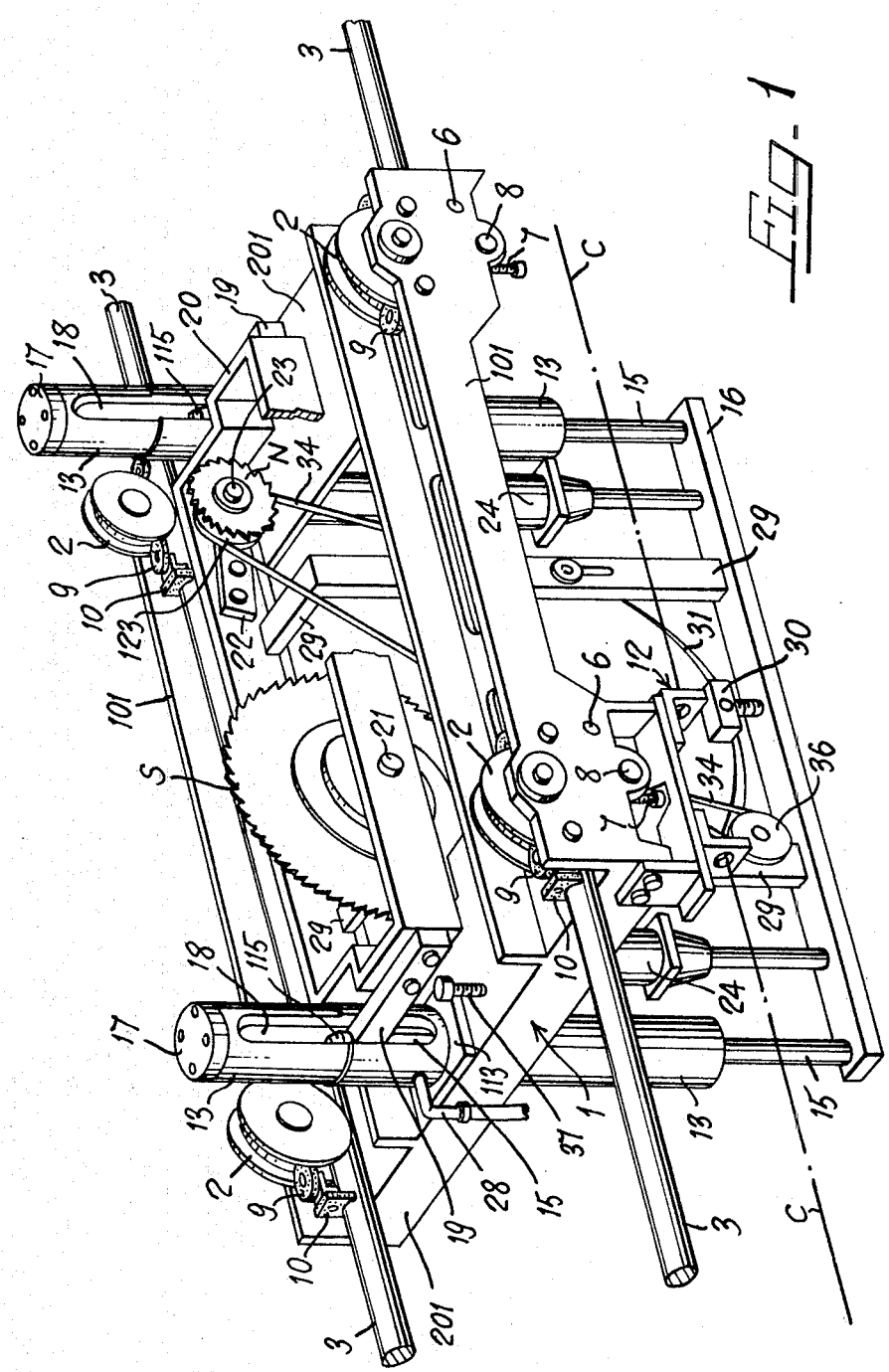
FIG. 1 is a diagrammatic perspective view of the saw-carrying carriage according to the invention.
Figure 2:
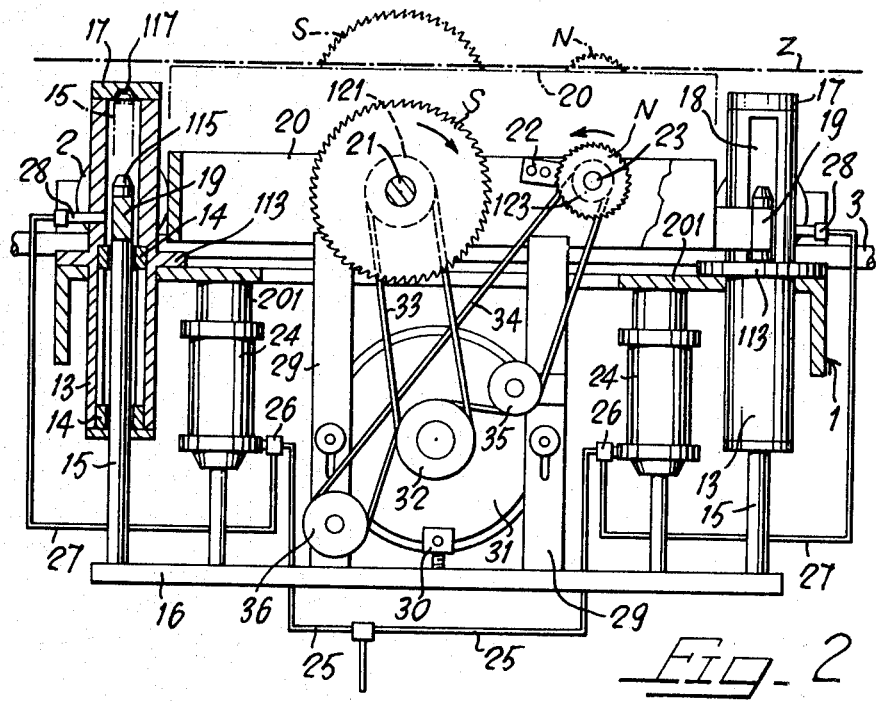
FIG. 2 is a longitudinal vertical section of the saw-carrying carriage.
Figure 3:
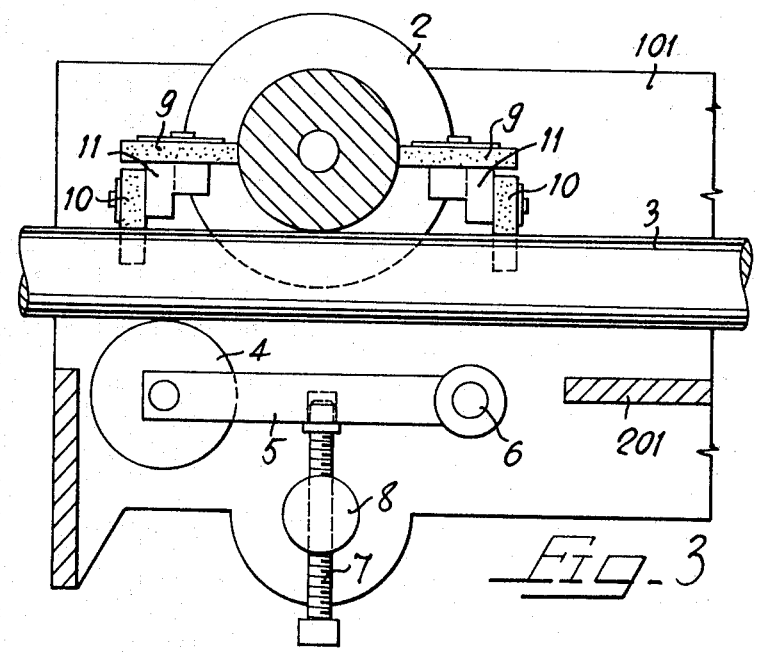
FIG. 3 is a side elevation view, with parts in section, of a detail showing one of the four wheel assemblies of the saw-carrying carriage.

With reference to FIGS. 1 and 2, the saw-carrying carriage comprises a rectangular supporting frame 1 which is provided, at the ends of its sides 101, with grooved wheels 2 by means of which the said carriage can move on rectilinear parallel guide rods 3, fixed beneath the working surface Z, i.e., the upper surface of the workpiece support table of the sawing machine. With particular reference to FIG. 3, below each grooved wheel 2 there is arranged a reaction roller 4 for the purpose of preventing movement of the carriage other than the movement on guides 3. Each reaction roller 4 is supported by a lever 5 fulcrumed at 6 to the respective side 101 of the carriage frame 1. The lever 5 cooperates, in its intermediate portion, with an adjustment screw 7, which is screwed in a threaded bore passing through a transverse pin 8 secured to the side 101 of the carriage frame.

At both sides of each grooved wheel 2, with reference to the direction of movement of the carriage, there are provided suitably shaped felt pads 9 and 10 mounted on supporting brackets 11 secured to the carriage frame. Felt pads 9 serve for cleaning of the groove of each wheel 2, while felt pads 10 serve for cleaning of the bearing surface of each guide 3.

The carriage is caused to move along guides 3 in a known manner by connecting side attachment 12 of the carriage to the opposite ends of a coupling chain C passing around fixed sprockets arranged at the extremities of the cutting line of the workpiece support table, one of said sprockets being driven alternately in either direction.

In the intermediate zone of the transverse members 201 of the carriage frame 1 there are secured, by means of an intermediate flange 113, vertical guide elements 13 which are parallel and equal to each other and have a tubular structure, at the interior of which are arranged, for longitudinal sliding movement, with the interposition of slide bushings 14, the vertical rods 15 being connected to each other by means of a bar 16. The upper ends 115 of the vertical rods 15 are conically shaped and, whenever they reach their highest position at the end of the upward stroke at the interior of the tubular guides 13, they snugly fit inside a corresponding hollow conical seat 117 in the bottom of the covers 17 which close the upper extremities of the tubular guides 13.

The portion of each tubular guide 13 above the carriage frame 1 is provided with a vertical longitudinal slot 18 through which there passes the arm 19. The arms 19 are connected, at the interior of the tubular guides 13, to the vertical rods 15 while at the exterior they support a horizontal frame 20, on which are mounted the shaft 21 of the circular saw S, and also, by means of a suitable support bar 22, the shaft 23 of the scoring tool N. The said scoring tool N, which is conveniently employed in this type of sawing machine, usually consists of a circular blade of small dimensions, which is caused to rotate in a direction opposite to the direction of rotation of the main circular saw S, and is arranged upstream of the said main circular saw, having regard to the direction of the working stroke of the sawing machine. The utilization of a scoring tool of the above referred type is illustrated in the already mentioned British Pat. No. 1,232,800, in my name.

From FIGS. 1 and 2 it is apparent that the bar 16 is connected, at its end portions, to the stems of the pistons of a pair of pneumatic cylinders 24, the bodies of said cylinders 24 being secured to the traverse members 201 of the carriage frame 1. The cylinders 24 are preferably of the single-acting type and they are actuated by means of a pneumatic circuit comprising ducts 25 branching off from a common feed duct, and three-way valves 26, from which ducts 27 lead to nozzles 28 opening at the interior of the tubular guides 13 and directed against the rods 15 and the upper bushings 14.

The bar 16 is connected, by means of two uprights 29, to the frame 20 which carries the circular saw S and the scoring tool N. To the said uprights 29 and to a support 30 located at mid-point of the bar 16, there is secured the electric motor 31, on the shaft of which there is keyed a double pulley 32 for rotatably driving the main saw S and the scoring tool N. The driving of the main circular saw S takes place thanks to a transmission belt 33 which couples the driving pulley 32 to the pulley 121 of the said saw S. The driving of the scoring tool N takes place thanks to a transmission belt 34, presenting a round section, which couples the said driving pulley 32 to the pulley 123 of the scoring tool with the aid of interposed jockeys 35 and 36, in such a manner that the scoring tool N rotates in a direction opposite to the direction of rotation of saw S, as clearly appears from FIG. 2.

The operation of the device is as follows. Whenever the saw-carrying carriage is in its rest position, as indicated by full lines in FIG. 2, the arms 19 and the horizontal frame 20 rest on abutment screws 37 (see FIG. 1) provided on the transverse members 201 of the carriage frame 1. The pneumatic cylinders 24 are then not operative and both the main circular saw S and the scoring tool N are located below the working surface, schematically indicated by the letter Z.

In order to bring the saw S and the scoring tool N to their working position, i.e., to cause them to project a correct amount above the working surface Z through a slot defining a cutting line, as indicated in FIG. 2 by dash-and-dot lines, air under pressure is fed, through ducts 25 and valves 26, to the cylinders 24, so that the rods of the pistons of the said cylinders are retracted, thus promoting the lifting of the movable structure consisting of bar 16, vertical rods 15, arms 19, uprights 29 and the horizontal frame 20 which carries the main circular saw S and the scoring tool N. During this phase, the vertical rods 15 slide with optimum accuracy at the interior of the tubular guides 13, and, at the end of their upward stroke, they fit snugly with their conical ends 115 into the corresponding hollow conical seats 117. In this manner stable and accurate positioning of the whole movable structure in its raised position is assured.

In order to effect the lowering of the saw S and scoring tool N, the air contained in cylinders 24 is allowed to be discharged, through valves 26, ducts 27 and nozzles 28, at the interior of the tubular guides 13. In this manner, the air jets streaming out of nozzles 28 effect cleaning of the vertical rods 15, by removing any sawdust attached to them, after entering through the slots 18. In this manner, wear of the upper slide bushings 14 is considerably reduced.

I claim:
1. Sawing apparatus of the type comprising a horizontal workpiece support table having a longitudinal slot defining a cutting line, and a circular saw mounted on a carriage reciprocably movable along a path parallel to and beneath said cutting line, said carriage having a supporting frame (1) movable along horizontal guides (3), wherein
    (a) said circular saw and means for rotatably driving said saw are mounted on a structure which is vertically movable on said supporting frame means being provided for effecting up-and-down movement of said structure;
    (b) said structure comprising at least a pair of vertical parallel rods (15) slidable within vertical tubular guides (13) secured to said supporting frame;
    (c) said vertical rods (15) having conically shaped upper ends, and said vertical tubular guides (13) having, at their upper ends, downwardly facing hollow conical seats;
    (d) whereby, at the end of the upward stroke of said structure with respect to said supporting frame, said conical ends of said vertical rods snugly fit into said conical seats of said tubular guides.

2. Sawing apparatus according to claim 1, wherein said means provided for effecting up-and-down movement comprises a piston-and-cylinder unit said vertical rods (15) being secured at their lower ends to a bar to which is also secured one end of said unit, the other extremity of said unit being secured to said supporting frame, and comprising ducts for supplying pressurized fluid to said unit, whereby retraction of the piston inside the cylinder causes said structure to lift with respect to said supporting frame, and consequently said circular saw to be raised above said workpiece support table.

3. Sawing apparatus according to claim 2, wherein a said piston-and-cylinder unit is provided for each parallel rod of said vertically movable structure, and said pressurized fluid is air, and comprising discharge ducts for discharging said air from said cylinders through air nozzles directed against said vertical rods, whereby lowering of said structure causes the discharge of the air contained in said cylinders through said nozzles to clean said vertical rods of sawdust.

4. Sawing apparatus according to claim 1, in which said guides (3) comprise a pair of longitudinal parallel rods, and comprising grooved wheels (2) on each side of said frame for rolling engagement with said guide rods, and felt pads at both sides of each said grooved wheel, for cleaning the groove of said wheel and the bearing surface of said guide rod, said felt pads being mounted on brackets secured to said carriage-supporting frame.

\* \* \* \* \*